United States Patent
Sadohara

(10) Patent No.: US 8,252,104 B2
(45) Date of Patent: *Aug. 28, 2012

(54) WATER-BASED INFRARED ABSORPTIVE INK FOR INK-JET RECORDING, INK-JET RECORDING METHOD, AND INK-JET RECORDING APPARATUS

(75) Inventor: Hitomi Sadohara, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 789 days.

This patent is subject to a terminal disclaimer.

(21) Appl. No.: 12/266,203

(22) Filed: Nov. 6, 2008

(65) Prior Publication Data

US 2009/0117278 A1  May 7, 2009

(30) Foreign Application Priority Data

Nov. 6, 2007 (JP) ................................. 2007-288077

(51) Int. Cl.
 *C09D 11/02* (2006.01)
(52) U.S. Cl. .................................. 106/31.6; 106/31.65
(58) Field of Classification Search ................. 106/31.6, 106/31.65
 See application file for complete search history.

(56) References Cited

U.S. PATENT DOCUMENTS

| 5,350,448 A | 9/1994 | Dietz et al. | |
| 7,802,881 B2 * | 9/2010 | Sadohara | 347/100 |
| 2003/0024434 A1 * | 2/2003 | Butler et al. | 106/31.28 |
| 2004/0253419 A1 * | 12/2004 | Bleikolm et al. | 428/195.1 |
| 2005/0253117 A1 | 11/2005 | Pfaff et al. | |
| 2007/0082963 A1 * | 4/2007 | Bhatt | 522/6 |
| 2008/0233313 A1 * | 9/2008 | Chatow et al. | 428/30 |
| 2009/0288581 A1 * | 11/2009 | Huber et al. | 106/31.92 |

FOREIGN PATENT DOCUMENTS

| JP | H03-050274 A | 3/1991 |
| JP | H03-115471 A | 5/1991 |
| JP | H03-154187 A | 7/1991 |
| JP | H03-227378 A | 10/1991 |
| JP | H06-025553 A | 2/1994 |
| JP | 2000-309736 A | 11/2000 |
| JP | 2000-327941 A | 11/2000 |
| JP | 2001-262016 A | 9/2001 |
| JP | 2005-015608 A | 1/2005 |
| JP | 2005-336485 A | 12/2005 |
| WO | WO 2006018169 A1 * | 2/2006 |
| WO | 2007/044106 A1 | 4/2007 |

OTHER PUBLICATIONS

Japan Patent Office, Notification of Reason for Refusal for Japanese Patent Application No. 2007-288776 (counterpart to above-captioned patent application), dispatched Apr. 18, 2012.

Japan Patent Office, Notification of Reasons for Refusal for Japanese Patent Application No. 2007-288077 (counterpart to above-captioned patent application), dispatched Apr. 11, 2012.

* cited by examiner

*Primary Examiner* — Melvin C Mayes
*Assistant Examiner* — Veronica F Faison
(74) *Attorney, Agent, or Firm* — Baker Botts L.L.P.

(57) ABSTRACT

A water-based infrared absorptive ink for ink-jet recording is provided that absorbs electromagnetic waves in the infrared range without adversely affecting the color tone of recorded objects. The water-based infrared absorptive ink for ink-jet recording contains antimony-tin composite oxide fine particles and a coloring agent.

14 Claims, No Drawings

WATER-BASED INFRARED ABSORPTIVE INK FOR INK-JET RECORDING, INK-JET RECORDING METHOD, AND INK-JET RECORDING APPARATUS

CROSS REFERENCE TO RELATED APPLICATION

The present invention claims a priority from Japanese Patent Application No. 2007-288077, which was filed on Nov. 6, 2007, the disclosure of which is herein incorporated by reference in its entirety.

BACKGROUND OF THE INVENTION

1. Field of the Invention

The present invention relates to a water-based infrared absorptive ink for ink-jet recording capable of producing images that absorb infrared light, to an ink-jet recording method using the ink, and to an ink-jet recording apparatus for implementing the method.

2. Description of the Related Art

As inks for producing code marks such as bar codes and OCR characters, infrared absorptive inks capable of producing visually unreadable code marks have been developed to improve security. As such infrared absorptive inks, for example, there were proposed inks in which a cyanine-based or naphthoquinone-based coloring agent is used and inks in which a coloring agent composed of a resin containing powder of tin-doped indium oxide (ITO) is used.

The above-mentioned infrared absorptive inks in which an organic-based coloring agent is used have a problem that the color tones of the inks may not be controlled, because the inks have absorption in the visible light range. Meanwhile, the infrared absorptive inks in which ITO powder is used have little absorption in the visible light range. ITO powder is an expensive material. In addition, generally, ITO powder is often used in inks containing an organic solvent and other similar inks and cannot be used in water-based inks and in ink-jet recording methods using the water-based inks.

SUMMARY

It is an object of the invention to provide a water-based infrared absorptive ink for ink-jet recording that absorbs electromagnetic waves in the infrared range without change in the color tone of the ink.

The present inventor has found that the above object can be achieved by using, as an infrared absorbing agent, antimony-tin composite oxide fine particles (hereinafter, "antimony-tin composite oxide fine particles" may be referred to as "ATO fine particles") that are less expensive than ITO powder, absorb little visible light, and absorb electromagnetic waves in the near-infrared range.

An aspect of the present invention provides a water-based infrared absorptive ink for ink-jet recording comprising antimony-tin composite oxide fine particles and a coloring agent (hereinafter, the "water-based infrared absorptive ink for ink-jet recording" may be referred to as an "ink").

Another aspect of the present invention also provides an ink-jet recording method for recording an image by ejecting an ink onto a recording medium to cause the ink to adhere to the recording medium. The method is characterized in that a water-based infrared absorptive ink for ink-jet recording that comprises ATO fine particles and a coloring agent is used as the ink to impart infrared absorptivity to the image to be recorded.

A further aspect of the present invention provides an ink-jet recording apparatus comprising: an ink storage unit that stores a water-based infrared absorptive ink for ink-jet recording that comprises ATO fine particles and a coloring agent; and an ejection mechanism that ejects a droplet of the water-based infrared absorptive ink for ink-jet recording.

DETAILED DESCRIPTION OF THE PREFERRED EMBODIMENT

The water-based infrared absorptive ink for ink-jet recording comprises ATO fine particles and a coloring agent.

The ATO fine particles have little absorption in the visible light range, but exhibit absorbance in the near-infrared range at a wavelength of 800 nm or more, and the absorbance increases as the wavelength increases. In images recorded with the water-based infrared absorptive ink for ink-jet recording, and in particular, in images recorded using the ink-jet recording method and the ink-jet recording apparatus, the color tones of the recorded objects are not influenced by the ATO fine particles. In addition, although it may not be visually confirmed whether the recorded objects have the infrared absorptivity or not, these recorded objects can be distinguished from recorded objects recorded with other infrared absorptive materials by analyzing reflection or transmission spectra in the near-infrared range.

When the average particle diameter of the ATO fine particles is too small, the specific surface area of the ATO fine particles is excessively large. In such a case, a strong attractive force acts between the particles, and the dispersion stability of the ATO fine particles in the water-based infrared absorptive ink for ink-jet recording tends to decrease. When the average particle diameter thereof is too large, light is strongly scattered. The transparency of images recorded with the water-based infrared absorptive ink for ink-jet recording tends to decrease, and an ink-jet recording head may be easily clogged. The average particle diameter of the ATO fine particles is in the range of from about 5 nm to about 800 nm and in the range of from about 5 nm to about 200 nm. In the above ranges, the dispersion stability of the water-based infrared absorptive ink for ink-jet recording may be ensured. In addition, substantially transparent code marks and the like may be recorded. The transparency of transparent substrates, such as films for an overhead projector, used as recording media may be maintained, and the transparency of undercoat layers may be maintained.

In particular, when code mark patterns are required to have high transparency, i.e., the scattering of light in the visible light range of from about 400 nm to about 780 nm must be suppressed, the average particle diameter of the ATO fine particles is about 200 nm or less and about 150 nm or less. This is because when the particle diameter is about 200 nm or less, the amount of scattered light decreases and Rayleigh scattering occurs. In the Rayleigh scattering region, the intensity of the scattered light decreases in inverse proportion to the sixth power of the particle diameter, and the transparency increases as the particle diameter decreases. When the particle diameter is about 150 nm or less, the amount of scattered light further decreases, and the absorption efficiency is further improved.

In view of the dispersion stability, the average particle diameter of the ATO fine particles is about 10 nm or more, about 20 nm or more and about 50 nm or more.

Particles produced by mixing antimony oxide powder and tin oxide powder, sintering the mixed powder at about 1,000° C. to about 1,300° C., and subjecting the sintered product to size reduction according to routine methods may be used as the above ATO fine particles. Specific examples of the ATO fine particles include, without any limitations, SN-100D (product of Ishihara Sangyo Kaisha, Ltd.), TDL (product of JEMCO Inc.) and the like.

When the amount of the above-described ATO fine particles in the water-based infrared absorptive ink for ink-jet recording is too small, the infrared absorptivity imparted to recording media is insufficient. Multiple printing, for example, must be performed to obtain sufficient infrared absorptivity, and, disadvantageously, the process for forming code marks becomes complicated. When the amount of the above-described ATO fine particles is too large, disadvantageously, nozzles of an ink-jet recording head is easily clogged. The amount of the ATO fine particles in the water-based infrared absorptive ink for ink-jet recording is in the range of from about 0.3 wt % to about 10 wt %, in the range of from about 0.3 wt % to about 7 wt % and in the range of from about 0.5 wt % to about 7 wt %.

The coloring agent may be selected from among water soluble dyes, pigments and mixtures thereof. Images recorded with the water-based infrared absorptive ink for ink-jet recording exhibit an absorption spectrum originating from the coloring agent in the visible light range and exhibit a characteristic absorption spectrum originating from the ATO fine particles in the infrared range. Because the ATO fine particles absorb almost no light in the visible light range, the original color of the coloring agent is maintained in the recorded objects. For example, the water-based infrared absorptive ink for ink-jet recording comprising a black dye as the coloring agent allowing infrared light to pass therethrough and a black ink comprising only the black dye are recognized to have the same black color by human eyes but show different transmission profiles under infrared radiation. When an image (recorded object) recorded by use of the above black water-based infrared absorptive ink for ink-jet recording, such as a recorded object having a bar code, is subjected to printing by use of an ordinary black ink comprising no infrared absorptive materials, more complicated and sophisticated security may be realized.

Any water soluble dye used in conventional ink-jet inks may be used as the water soluble dye, so long as it satisfies the required vividness, water solubility, stability, light fastness, ozone resistance and other required properties. Examples of the dye include, without any limitations, various types of dyes such as direct dyes, acid dyes, basic dyes and reactive dyes. These exemplary dyes are classified according to their structure into azo dyes, metal complex dyes, naphthol dyes, anthraquinone dyes, indigo dyes, carbonium dyes, quinoneimine dyes, xanthene dyes, aniline dyes, quinoline dyes, nitro dyes, nitroso dyes, benzoquinone dyes, naphthoquinone dyes, phthalocyanine dyes, metal phthalocyanine dyes and the like.

Examples of the water soluble dye include, without any limitations: C.I. Direct Blacks 17, 19, 32, 51, 71, 108, 146, 154, 168 and the like; C.I. Direct Yellows 12, 24, 26, 27, 28, 33, 39, 58, 86, 98, 100, 132, 142 and the like; C.I. Direct Reds 4, 17, 28, 37, 63, 75, 79, 80, 83, 99, 220, 224, 227 and the like; C.I. Direct Violets 47, 48, 51, 90, 94 and the like; C.I. Direct Blues 1, 6, 8, 15, 22, 25, 71, 76, 80, 86, 90, 106, 108, 123, 163, 165, 199, 226 and the like; C.I. Acid Blacks 2, 7, 24, 26, 31, 52, 63, 112, 118 and the like; C.I. Acid Yellows 3, 11, 17, 19, 23, 25, 29, 38, 42, 49, 59, 61, 71, 72 and the like; C.I. Acid Reds 1, 6, 8, 17, 18, 32, 35, 37, 42, 51, 52, 57, 80, 85, 87, 92, 94, 115, 119, 131, 133, 134, 154, 181, 186, 249, 254, 256, 289, 315, 317, 407 and the like; C.I. Acid Violets 10, 34, 49, 75 and the like; C.I. Acid Blues 9, 22, 29, 40, 59, 62, 93, 102, 104, 113, 117, 120, 167, 175, 183, 229, 234 and the like; C.I. Basic Blacks 2 and the like; C.I. Basic Yellows 40 and the like; C.I. Basic Reds 1, 2, 9, 12, 13, 14, 37 and the like; C.I. Basic Violets 7, 14, 27 and the like; C.I. Basic Blues 1, 3, 5, 7, 9, 24, 25, 26, 28, 29 and the like; C.I. Reactive Yellows 2, 3, 13, and the like; C.I. Reactive Reds 4, 23, 24, 31, 56, 180 and the like; and C.I. Reactive Blues 7, 13, 21 and the like.

When the water soluble dye is used in the water-based infrared absorptive ink for ink-jet recording, the ratio of the amount of the water soluble dye depends on a predetermined printing density and color. When the amount is too small, the color is not satisfactorily developed on a recording medium. When the amount is too large, nozzles of an ink-jet recording head is easily clogged. The amount of the water soluble dye with respect to the total amount of the water-based infrared absorptive ink for ink-jet recording is in the range of from about 0.1 wt % to about 10 wt %, in the range of from about 0.3 wt % to about 10 wt % and in the range of from about 0.5 wt % to about 7 wt %.

When a pigment is used, an infrared transparent pigment may be used. Examples of such a pigment include, without any limitations: yellow pigments such as C.I. Pigment Yellows 3, 13, 74, 83, 154 and the like; magenta pigments such as C.I. Pigment Reds 5, 48, 112, 122, 177, 202, 207 and the like; and cyan pigments such as C.I. Pigment Blues 15, 15:3, 15:4, 16, 60 and the like.

In case of using a pigment, when the amount of the pigment used in the water-based infrared absorptive ink for ink-jet recording is too small, the color is not satisfactorily developed on a recording medium. When the amount is too large, nozzles of an ink-jet recording head is easily clogged. The amount of the pigment with respect to the total amount of the water-based infrared absorptive ink for ink-jet recording is in the range of from about 1 wt % to about 10 wt % and in the range of from about 1 wt % to about 7 wt %.

The particle diameter of the pigment is in the range of from about 5 nm to about 800 nm because of the same reason as that for the ATO fine particles. The upper limit of the particle diameter is about 200 nm or less and about 150 nm or less. The lower limit of the particle diameter is about 10 nm or more, about 20 nm or more and about 50 nm or more.

The water-based infrared absorptive ink for ink-jet recording comprises water. Deionized water is used. The ratio of the amount of water depends on the type of the water soluble organic solvent used, the composition of the ink and the desired characteristics of the ink and is determined over a wide range. When the amount of water is too small, the viscosity of the ink increases to cause difficulty in ejecting the ink. When the amount of water is too large, the coloring agent or an additive is precipitated and/or aggregated due to the evaporation of water, so that nozzles of an ink-jet recording head is more likely to be clogged. The amount of water with respect to the total amount of the water-based infrared absorptive ink for ink-jet recording is in the range of from about 10 wt % to about 95 wt %, in the range of from about 10 wt % to about 80 wt % and in the range of from about 20 wt % to about 80 wt %.

The water-based infrared absorptive ink for ink-jet recording further may comprises water soluble organic solvents, such as a humectant and a penetrant, used commonly in ink-jet recording inks.

The humectant is added to the ink to prevent clogging of nozzles of an ink-jet recording head. Examples of the humectant include, without any limitations: water soluble glycols such as glycerin, ethylene glycol, diethylene glycol, triethylene glycol, polyethylene glycol, propylene glycol, dipropylene glycol, tripropylene glycol, polypropylene glycol, 1,5-pentanediol, 1,6-hexanediol and the like.

When the ratio of the amount of the humectant in the water-based infrared absorptive ink for ink-jet recording is too small, clogging of nozzles of an ink-jet recording head is not sufficiently prevented. When the amount is too large, the viscosity of the ink increases to cause difficulty in ejecting the ink. The amount of the humectant with respect to the total amount of the water-based infrared absorptive ink for ink-jet recording is in the range of from about 5 wt % to about 50 wt %, in the range of from about 10 wt % to about 40 wt % and in the range of from about 15 wt % to about 35 wt %.

The penetrant is used to facilitate the penetration of the ink into a recording material after printing and to adjust the surface tension of the ink. Examples of the penetrant include, without any limitations: glycol ethers typified by ethylene glycol-based alkyl ethers and propylene glycol-based alkyl ethers and the like. Examples of the ethylene glycol-based alkyl ethers include, without any limitations: ethylene glycol methyl ether, ethylene glycol ethyl ether, ethylene glycol-n-propyl ether, ethylene glycol-n-butyl ether, ethylene glycol isobutyl ether, diethylene glycol methyl ether, diethylene glycol ethyl ether, diethylene glycol-n-propyl ether, diethylene glycol-n-butyl ether, diethylene glycol isobutyl ether, triethylene glycol methyl ether, triethylene glycol ethyl ether, triethylene glycol-n-propyl ether, triethylene glycol-n-butyl ether, triethylene glycol isobutyl ether and the like. Examples of the propylene glycol-based alkyl ethers include, but are not limited to: propylene glycol methyl ether, propylene glycol ethyl ether, propylene glycol-n-propyl ether, propylene glycol-n-butyl ether, dipropylene glycol methyl ether, dipropylene glycol ethyl ether, dipropylene glycol-n-propyl ether, dipropylene glycol-n-butyl ether, tripropylene glycol methyl ether, tripropylene glycol ethyl ether, tripropylene glycol-n-propyl ether, tripropylene glycol-n-butyl ether and the like.

When the ratio of the amount of the penetrant in the water-based infrared absorptive ink for ink-jet recording is too small, sufficient penetrability is not obtained. When the amount is too large, the penetrability becomes excessively high, and blurring such as feathering tends to occur. The amount of the penetrant with respect to the total amount of the water-based infrared absorptive ink for ink-jet recording is in the range of from about 0.5 wt % to about 10 wt % and in the range of from about 0.5 wt % to about 7 wt %.

In addition to the humectant and the penetrant, another water soluble organic solvent may be added to the water-based infrared absorptive ink for ink-jet recording for the purposes of, for example, preventing the ink from drying at the end portions of nozzles of an ink-jet recording head, increasing the printing density and developing vivid color. Examples of such a water soluble organic solvent include, without any limitations: lower alcohols such as methyl alcohol, ethyl alcohol, n-propyl alcohol, isopropyl alcohol, n-butyl alcohol, sec-butyl alcohol, tert-butyl alcohol and the like; amides such as dimethylformamide, dimethylacetamide and the like; ketones and keto-alcohols such as acetone, diacetone alcohol and the like; ethers such as tetrahydrofuran, dioxane and the like; glycerin; pyrrolidones such as 2-pyrrolidone, N-methyl-2-pyrrolidone and the like; 1,3-dimethyl-2-imidazolidinone; and the like.

Various surfactants may be added to the water-based infrared absorptive ink for ink-jet recording to adjust the surface tension. Examples of the surfactants include, without any limitations: anionic surfactants such as higher alcohol sulfate ester salts, liquid fatty oil sulfate ester salts, alkyl allyl sulfonates and the like; and non-ionic surfactants such as polyoxyethylene alkyl ethers, polyoxyethylene alkyl esters, sorbitan alkyl esters, polyoxyethylene sorbitan alkyl esters; and the like.

The water-based infrared absorptive ink for ink-jet recording may be manufactured by mixing the above ATO fine particles, the coloring agent and the solvents such as water, and uniformly dispersing the ATO fine particles and the coloring agent in the solvents according to routine methods.

The thus manufactured water-based infrared absorptive ink for ink-jet recording may be used in an ink-jet recording method described below. In this ink-jet recording method, an image is recorded by ejecting an ink onto a recording medium to cause the ink to adhere to the recording medium. The method is characterized in that the water-based infrared absorptive ink for ink-jet recording is used as the ink to impart infrared absorptivity to the image to be recorded.

This ink-jet recording method may be the same as conventional ink-jet recording methods, except that the water-based infrared absorptive ink for ink-jet recording is used as the ink. Any recording medium used for the conventional ink-jet recording methods may be used as the recording medium. For example, recording paper having on one or both sides an ink-receiving layer capable of receiving a water-based ink-jet ink may be used.

The water-based infrared absorptive ink for ink-jet recording and the ink-jet recording method may be used for an ink-jet recording apparatus including: an ink storage unit that stores the water-based infrared absorptive ink for ink-jet recording; and an ejection mechanism that ejects droplets of the ink. The structure of this ink-jet recording apparatus may be the same as those of conventional ink-jet recording apparatuses, except that the water-based infrared absorptive ink for ink-jet recording is used as the ink.

EXAMPLES

The present invention will now be specifically described by way of Examples and Comparative Examples. In the Examples and Comparative Examples, infrared absorptive black, yellow, magenta and cyan inks comprising the ATO fine particles were prepared. Subsequently, ink-jet recording was performed using each ink, and a reflection spectrum in the infrared range was measured and evaluated in a recording area formed on an ink-jet recording paper.

(1) Preparation of the Inks

Each of the inks was prepared using the procedures described below. The compositions of the prepared inks are summarized in Tables 1 to 4. In each of the ink compositions summarized in Tables 1 to 4, the amount of each component actually contained in the ink is expressed in terms of percent by weight. The average particle diameter of the secondary particles of the ATO fine particles used is a value obtained through the measurement of the particle diameter distribution of an ATO fine particle dispersion (SN-100D, product of Ishihara Sangyo Kaisha, Ltd.). Specifically, the particle diameter distribution was measured in a diluted solution obtained by diluting the ATO fine particle dispersion 1,500-fold with ion exchanged water by using a dynamic light scattering nano-analyzer (LB-500, product of HORIBA, Ltd.). Inks 1 to 5, 7 to 11, 13 to 17, 19 to 23, 25 to 29, 31 to 35 and 37 to 41 were water-based infrared absorptive inks for ink-jet recording of the Examples of the present invention. The other inks were water-based inks for ink-jet recording of the Comparative Examples that do not comprise the ATO fine particles.

a) Ink 1 (Infrared Absorptive Black Dye Ink)

3.0 parts by weight of C.I. Direct Black 154, 54.3 parts by weigh of water (ion exchanged water), 23.0 parts by weight of glycerin and 3.0 parts by weight of dipropylene glycol-n-propyl ether were mixed, whereby 83.3 parts by weight of a black dye aqueous solution was obtained. 83.3 parts by weight of the obtained black dye aqueous solution was gradually added to 16.7 parts by weight of an ATO fine particle dispersion (SN-100D, product of Ishihara Sangyo Kaisha, Ltd., the average diameter of secondary particles: 128 nm, solids content: 30 wt %) under stirring. After stirred for 30 minutes, the mixture was filtrated through a membrane filter having a pore diameter of 1 μm, whereby ink 1 was obtained. The amount of the ATO fine particles in the ink 1 was 5 wt %.

b) Ink 2 (Infrared Absorptive Black Dye Ink)

3.0 parts by weight of C.I. Direct Black 154, 60.0 parts by weigh of water (ion exchanged water), 24.0 parts by weight of glycerin and 3.0 parts by weight of dipropylene glycol-n-propyl ether were mixed, whereby 90.0 parts by weight of a black dye aqueous solution was obtained. 90.0 parts by weight of the obtained black dye aqueous solution was gradually added to 10.0 parts by weight of an ATO fine particle dispersion (SN-100D, product of Ishihara Sangyo Kaisha, Ltd., the average diameter of secondary particles: 128 nm, solids content: 30 wt %) under stirring. After stirred for 30 minutes, the mixture was filtrated through a membrane filter having a pore diameter of 1 μm, whereby ink 2 was obtained. The amount of the ATO fine particles in the ink 2 was 3 wt %.

c) Ink 3 (Infrared Absorptive Black Dye Ink)

3.0 parts by weight of C.I. Direct Black 154, 65.7 parts by weight of water (ion exchanged water), 25.0 parts by weight of glycerin and 3.0 parts by weight of dipropylene glycol-n-propyl ether were mixed, whereby 96.7 parts by weight of a black dye aqueous solution was obtained. 96.7 parts by weight of the obtained black dye aqueous solution was gradually added to 3.3 parts by weight of an ATO fine particle dispersion (SN-100D, product of Ishihara Sangyo Kaisha, Ltd., the average diameter of secondary particles: 128 nm, solids content: 30 wt %) under stirring. After stirred for 30 minutes, the mixture was filtrated through a membrane filter having a pore diameter of 1 μm, whereby ink 3 was obtained. The amount of the ATO fine particles in the ink 3 was 1 wt %.

d) Ink 4 (Infrared Absorptive Black Dye Ink)

3.0 parts by weight of C.I. Direct Black 154, 66.8 parts by weigh of water (ion exchanged water), 25.5 parts by weight of glycerin and 3.0 parts by weight of dipropylene glycol-n-propyl ether were mixed, whereby 98.3 parts by weight of a black dye aqueous solution was obtained. 98.3 parts by weight of the obtained black dye aqueous solution was gradually added to 1.7 parts by weight of an ATO fine particle dispersion (SN-100D, product of Ishihara Sangyo Kaisha, Ltd., the average diameter of secondary particles: 128 nm, solids content: 30 wt %) under stirring. After stirred for 30 minutes, the mixture was filtrated through a membrane filter having a pore diameter of 1 μm, whereby ink 4 was obtained. The amount of the ATO fine particles in the ink 4 was 0.5 wt %.

e) Ink 5 (Infrared Absorptive Black Dye Ink)

3.0 parts by weight of C.I. Direct Black 154, 67.7 parts by weigh of water (ion exchanged water), 26.0 parts by weight of glycerin and 3.0 parts by weight of dipropylene glycol-n-propyl ether were mixed, whereby 99.7 parts by weight of a black dye aqueous solution was obtained. 99.7 parts by weight of the obtained black dye aqueous solution was gradually added to 0.3 parts by weight of an ATO fine particle dispersion (SN-100D, product of Ishihara Sangyo Kaisha, Ltd., the average diameter of secondary particles: 128 nm, solids content: 30 wt %) under stirring. After stirred for 30 minutes, the mixture was filtrated through a membrane filter having a pore diameter of 1 μm, whereby ink 5 was obtained. The amount of the ATO fine particles in the ink 5 was 0.1 wt %.

f) Ink 6 (Black Dye Ink)

3.0 parts by weight of C.I. Direct Black 154, 68.0 parts by weigh of water (ion exchanged water), 26.0 parts by weight of glycerin and 3.0 parts by weight of dipropylene glycol-n-propyl ether were mixed. After stirred for 30 minutes, the mixture was filtrated through a membrane filter having a pore diameter of 1 μm, whereby ink 6 was obtained.

g) Inks 7 to 11 (Infrared Absorptive Yellow Dye Inks) and Ink 12 (Yellow Dye Ink)

The same procedure as in the ink 1 was repeated except that the ink composition was changed as summarized in Table 1, whereby inks 7 to 11 were prepared. The same procedure as in the ink 6 was repeated except that the ink composition was changed as summarized in Table 1, whereby ink 12 was prepared.

h) Inks 13 to 17 (Infrared Absorptive Magenta Dye Inks) and Ink 18 (Magenta Dye Ink)

The same procedure as in the ink 1 was repeated except that the ink composition was changed as summarized in Table 2, whereby inks 13 to 17 were prepared. The same procedure as in the ink 6 was repeated except that the ink composition was changed as summarized in Table 2, whereby ink 18 was prepared.

i) Inks 19 to 23 (Infrared Absorptive Cyan Dye Inks) and Ink 24 (Cyan Dye Ink)

The same procedure as in the ink 1 was repeated except that the ink composition was changed as summarized in Table 2, whereby inks 19 to 23 were prepared. The same procedure as in the ink 6 was repeated except that the ink composition was changed as summarized in Table 2, whereby ink 24 was prepared.

j) Ink 25 (Infrared Absorptive Yellow Pigment Ink)

15 parts by weight of C.I. Pigment Yellow 74, 5.0 parts by weight of polyoxyethylene lauryl ether ammonium sulfate, 15 parts by weight of glycerin and 65 parts by weight of water (ion exchanged water) were mixed. Subsequently, the mixture was subjected to dispersion in a wet sand mill using zirconia beads having a diameter of 0.3 mm as a medium, whereby a yellow pigment dispersion was obtained.

Separately, 49.1 parts by weight of water (ion exchanged water), 27.5 parts by weight of glycerin and 2.5 parts by weight of dipropylene glycol-n-propyl ether were mixed, whereby 79.1 parts by weight of an ink solvent was prepared. 79.1 parts by weight of the prepared ink solvent was gradually added to 20.9 parts by weight of an ATO fine particle dispersion (SN-100D, product of Ishihara Sangyo Kaisha, Ltd., the average diameter of secondary particles: 128 nm, solids content: 30 wt %) under stirring. The mixture was further stirred for 30 minutes, whereby a fluid dispersion of the ATO fine particles was prepared.

Subsequently, 80 parts by weight of the prepared fluid dispersion of the ATO fine particles was gradually added to 20 parts by weight of the yellow pigment dispersion under stirring. The mixture was further stirred for 30 minutes and was filtrated through a membrane filter having a pore diameter of 1 μm, whereby ink 25 was prepared. The amount of the ATO fine particles in the ink 25 was 5 wt %.

k) Ink 26 (Infrared Absorptive Yellow Pigment Ink)

15 parts by weight of C.I. Pigment Yellow 74, 5.0 parts by weight of polyoxyethylene lauryl ether ammonium sulfate, 15 parts by weight of glycerin and 65 parts by weight of water (ion exchanged water) were mixed. Subsequently, the mixture was subjected to dispersion in a wet sand mill using zirconia beads having a diameter of 0.3 mm as a medium, whereby a yellow pigment dispersion was obtained.

Separately, 56.9 parts by weight of water (ion exchanged water), 28.1 parts by weight of glycerin and 2.5 parts by weight of dipropylene glycol-n-propyl ether were mixed, whereby 87.5 parts by weight of an ink solvent was prepared. 87.5 parts by weight of the prepared ink solvent was gradually added to 12.5 parts by weight of an ATO fine particle dispersion (SN-100D, product of Ishihara Sangyo Kaisha, Ltd., the average diameter of secondary particles: 128 nm, solids content: 30 wt %) under stirring. The mixture was further stirred for 30 minutes, whereby a fluid dispersion of the ATO fine particles was prepared.

Subsequently, 80 parts by weight of the prepared fluid dispersion of the ATO fine particles was gradually added to 20 parts by weight of the yellow pigment dispersion under stirring. The mixture was further stirred for 30 minutes and was filtrated through a membrane filter having a pore diameter of 1 μm, whereby ink 26 was prepared. The amount of the ATO fine particles in the ink 26 was 3 wt %.

l) Ink 27 (Infrared Absorptive Yellow Pigment Ink)

15 parts by weight of C.I. Pigment Yellow 74, 5.0 parts by weight of polyoxyethylene lauryl ether ammonium sulfate, 15 parts by weight of glycerin and 65 parts by weight of water (ion exchanged water) were mixed. Subsequently, the mixture was subjected to dispersion in a wet sand mill using zirconia beads having a diameter of 0.3 mm as a medium, whereby a yellow pigment dispersion was obtained.

Separately, 64.6 parts by weight of water (ion exchanged water), 28.8 parts by weight of glycerin and 2.5 parts by weight of dipropylene glycol-n-propyl ether were mixed, whereby 95.9 parts by weight of an ink solvent was prepared. 95.9 parts by weight of the prepared ink solvent was gradually added to 4.1 parts by weight of an ATO fine particle dispersion (SN-100D, product of Ishihara Sangyo Kaisha, Ltd., the average diameter of secondary particles: 128 nm, solids content: 30 wt %) under stirring. The mixture was further stirred for 30 minutes, whereby a fluid dispersion of the ATO fine particles was prepared.

Subsequently, 80 parts by weight of the prepared fluid dispersion of the ATO fine particles was gradually added to 20 parts by weight of the yellow pigment dispersion under stirring. The mixture was further stirred for 30 minutes and was filtrated through a membrane filter having a pore diameter of 1 μm, whereby ink 27 was prepared. The amount of the ATO fine particles in the ink 27 was 1 wt %.

m) Ink 28 (Infrared Absorptive Yellow Pigment Ink)

15 parts by weight of C. I. Pigment Yellow 74, 5.0 parts by weight of polyoxyethylene lauryl ether ammonium sulfate, 15 parts by weight of glycerin and 65 parts by weight of water (ion exchanged water) were mixed. Subsequently, the mixture was subjected to dispersion in a wet sand mill using zirconia beads having a diameter of 0.3 mm as a medium, whereby a yellow pigment dispersion was obtained.

Separately, 66.0 parts by weight of water (ion exchanged water), 29.4 parts by weight of glycerin and 2.5 parts by weight of dipropylene glycol-n-propyl ether were mixed, whereby 97.9 parts by weight of an ink solvent was prepared. 97.9 parts by weight of the prepared ink solvent was gradually added to 2.1 parts by weight of an ATO fine particle dispersion (SN-100D, product of Ishihara Sangyo Kaisha, Ltd., the average diameter of secondary particles: 128 nm, solids content: 30 wt %) under stirring. The mixture was further stirred for 30 minutes, whereby a fluid dispersion of the ATO fine particles was prepared.

Subsequently, 80 parts by weight of the prepared fluid dispersion of the ATO fine particles was gradually added to 20 parts by weight of the yellow pigment dispersion under stirring. The mixture was further stirred for 30 minutes and was filtrated through a membrane filter having a pore diameter of 1 μm, whereby ink 28 was prepared. The amount of the ATO fine particles in the ink 28 was 0.5 wt %.

n) Ink 29 (Infrared Absorptive Yellow Pigment Ink)

15 parts by weight of C.I. Pigment Yellow 74, 5.0 parts by weight of polyoxyethylene lauryl ether ammonium sulfate, 15 parts by weight of glycerin and 65 parts by weight of water (ion exchanged water) were mixed. Subsequently, the mixture was subjected to dispersion in a wet sand mill using zirconia beads having a diameter of 0.3 mm as a medium, whereby a yellow pigment dispersion was obtained.

Separately, 67.4 parts by weight of water (ion exchanged water), 29.7 parts by weight of glycerin and 2.5 parts by weight of dipropylene glycol-n-propyl ether were mixed, whereby 99.6 parts by weight of an ink solvent was prepared. 99.6 parts by weight of the prepared ink solvent was gradually added to 0.4 parts by weight of an ATO fine particle dispersion (SN-100D, product of Ishihara Sangyo Kaisha, Ltd., the average diameter of secondary particles: 128 nm, solids content: 30 wt %) under stirring. The mixture was further stirred for 30 minutes, whereby a fluid dispersion of the ATO fine particles was prepared.

Subsequently, 80 parts by weight of the prepared fluid dispersion of the ATO fine particles was gradually added to 20 parts by weight of the yellow pigment dispersion under stirring. The mixture was further stirred for 30 minutes and was filtrated through a membrane filter having a pore diameter of 1 μm, whereby ink 29 was prepared. The amount of the ATO fine particles in the ink 29 was 0.1 wt %.

o) Ink 30 (Yellow Pigment Ink)

15 parts by weight of C.I. Pigment Yellow 74, 5.0 parts by weight of polyoxyethylene lauryl ether ammonium sulfate, 15 parts by weight of glycerin and 65 parts by weight of water (ion exchanged water) were mixed.

Subsequently, the mixture was subjected to dispersion in a wet sand mill using zirconia beads having a diameter of 0.3 mm as a medium, whereby a yellow pigment dispersion was obtained. Separately, 54.0 parts by weight of water (ion exchanged water), 24.0 parts by weight of glycerin and 2.5 parts by weight of dipropylene glycol-n-propyl ether were mixed, whereby 80.0 parts by weight of an ink solvent was prepared. 80.0 parts by weight of the prepared ink solvent was gradually added to 20.0 parts by weight of the yellow pigment dispersion under stirring. The mixture was further stirred for 30 minutes and was filtrated through a membrane filter having a pore diameter of 1 μm, whereby ink 30 was prepared.

p) Inks 31 to 35 (Infrared Absorptive Magenta Pigment Inks) and Ink 36 (Magenta Pigment Ink)

The same procedure as in the ink 25 was repeated except that the ink composition was changed as summarized in Table 4, whereby inks 31 to 35 were prepared. The same procedure as in the ink 30 was repeated except that the ink composition was changed as summarized in Table 4, whereby ink 36 was prepared.

q) Inks 37 to 41 (Infrared Absorptive Cyan Pigment Inks) and Ink 42 (Cyan Pigment Ink)

The same procedure as in the ink 25 was repeated except that the ink composition was changed as summarized in Table 4, whereby inks 37 to 41 were prepared. The same procedure as in the ink 30 was repeated except that the ink composition was changed as summarized in Table 4, whereby ink 42 was prepared.

TABLE 1

|  |  | Infrared absorptive black dye ink |  |  |  |  | Black dye ink | Infrared absorptive yellow dye ink |  |  |  |  | Yellow dye ink |
|---|---|---|---|---|---|---|---|---|---|---|---|---|---|
|  | Ink No. | 1 | 2 | 3 | 4 | 5 | 6 | 7 | 8 | 9 | 10 | 11 | 12 |
| Ink composition (wt %) | Water (ion exchanged water) | 54.3 | 60.0 | 65.7 | 66.8 | 67.7 | 68.0 | 54.8 | 60.5 | 66.2 | 67.3 | 68.2 | 68.5 |
|  | Glycerin | 23.0 | 24.0 | 25.0 | 25.5 | 26.0 | 26.0 | 23.5 | 24.5 | 25.5 | 26.0 | 26.5 | 26.5 |
|  | Dipropylene glycol-n-propyl ether | 3.0 | 3.0 | 3.0 | 3.0 | 3.0 | 3.0 | 3.0 | 3.0 | 3.0 | 3.0 | 3.0 | 3.0 |
|  | SN-100D (*1) | 16.7 | 10.0 | 3.3 | 1.7 | 0.3 | — | 16.7 | 10.0 | 3.3 | 1.7 | 0.3 | — |
|  | C.I. Direct Black 154 | 3.0 | 3.0 | 3.0 | 3.0 | 3.0 | 3.0 | — | — | — | — | — | — |
|  | C.I. Direct Yellow 86 | — | — | — | — | — | — | 0.4 | 0.4 | 0.4 | 0.4 | 0.4 | 0.4 |
|  | C.I. Direct Yellow 132 | — | — | — | — | — | — | 1.6 | 1.6 | 1.6 | 1.6 | 1.6 | 1.6 |
| Amount of ATO fine particles (wt %) |  | 5.0 | 3.0 | 1.0 | 0.5 | 0.1 | 0 | 5.0 | 3.0 | 1.0 | 0.5 | 0.1 | 0 |

(*1): Product of Ishihara Sangyo Kaisha, Ltd., aqueous dispersion of ATO fine particles, solids content: 30 wt %
* The ink composition is expressed in the weight percent ratio of each component actually contained in the ink to the total weight of the ink.

TABLE 2

|  |  | Infrared absorptive magenta dye ink |  |  |  |  | Magneta dye ink | Infrared absorptive cyan dye ink |  |  |  |  | Cyan dye ink |
|---|---|---|---|---|---|---|---|---|---|---|---|---|---|
|  | Ink No. | 13 | 14 | 15 | 16 | 17 | 18 | 19 | 20 | 21 | 22 | 23 | 24 |
| Ink composition (wt %) | Water (ion exchanged water) | 54.6 | 60.3 | 88.6 | 67.3 | 68.2 | 68.3 | 53.4 | 59.1 | 64.8 | 65.9 | 67.0 | 67.1 |
|  | Glycerin | 23.2 | 24.2 | 25.0 | 25.5 | 26.0 | 26.2 | 24.0 | 25.0 | 26.0 | 26.5 | 26.8 | 27.0 |
|  | Dipropylene glycol-n-propyl ether | 3.0 | 3.0 | 3.0 | 3.0 | 3.0 | 3.0 | 3.0 | 3.0 | 3.0 | 3.0 | 3.0 | 3.0 |
|  | SN-100D (*1) | 16.7 | 10.0 | 3.3 | 1.7 | 0.3 | — | 16.7 | 10.0 | 3.3 | 1.7 | 0.3 | — |
|  | C.I. Reactive Red 180 | 2.5 | 2.5 | 2.5 | 2.5 | 2.5 | 2.5 | — | — | — | — | — | — |
|  | C.I. Direct Blue 199 | — | — | — | — | — | — | 2.9 | 2.9 | 2.9 | 2.9 | 2.9 | 2.9 |
| Amount of ATO fine particles (wt %) |  | 5.0 | 3.0 | 1.0 | 0.5 | 0.1 | 0 | 5.0 | 3.0 | 1.0 | 0.5 | 0.1 | 0 |

(*1): Product of Ishihara Sangyo Kaisha, Ltd., aqueous dispersion of ATO fine particles, solids content: 30 wt %
* The ink composition is expressed in the weight percent ratio of each component actually contained in the ink to the total weight of the ink.

TABLE 3

|  |  | Infrared absorptive yellow pigment ink |  |  |  |  | Yellow pigment ink |
|---|---|---|---|---|---|---|---|
|  | Ink No. | 25 | 26 | 27 | 28 | 29 | 30 |
| Ink composition (wt %) | Water (ion exchanged water) | 52.3 | 58.5 | 64.7 | 65.8 | 66.9 | 67.0 |
|  | Glycerin | 25.0 | 25.5 | 26.0 | 26.5 | 26.8 | 27.0 |
|  | Dipropylene glycol-n-propyl ether | 2.0 | 2.0 | 2.0 | 2.0 | 2.0 | 2.0 |
|  | SN-100D (*1) | 16.7 | 10.0 | 3.3 | 1.7 | 0.3 | — |
|  | C.I. Pigment Yellow 74 | 3.0 | 3.0 | 3.0 | 3.0 | 3.0 | 3.0 |
|  | Polyoxyethylene lauryl ether ammonium sulfate (*2) | 1.0 | 1.0 | 1.0 | 1.0 | 1.0 | 1.0 |
| Amount of ATO fine particles (wt %) |  | 5.0 | 3.0 | 1.0 | 0.5 | 0.1 | 0 |

(*1): Product of Ishihara Sangyo Kaisha, Ltd., aqueous dispersion of ATO fine particles, solids content: 30 wt %
(*2): Average polymerization degree of oxyethylene = 12
* The ink composition is expressed in the weight percent ratio of each component actually contained in the ink to the total weight of the ink.

TABLE 4

|  |  | Infrared absorptive magenta pigment ink |  |  |  |  | Magenta pigment ink | Infrared absorptive cyan pigment ink |  |  |  |  | Cyan pigment ink |
|---|---|---|---|---|---|---|---|---|---|---|---|---|---|
|  | Ink No. | 31 | 32 | 33 | 34 | 35 | 36 | 37 | 38 | 39 | 40 | 41 | 42 |
| Ink | Water (ion | 52.1 | 58.3 | 64.5 | 65.7 | 66.8 | 66.8 | 51.8 | 58.0 | 64.2 | 65.5 | 66.5 | 66.5 |

TABLE 4-continued

|  |  | Infrared absorptive magenta pigment ink | | | | | Magenta pigment ink | Infrared absorptive cyan pigment ink | | | | | Cyan pigment ink |
|---|---|---|---|---|---|---|---|---|---|---|---|---|---|
| Ink No. | | 31 | 32 | 33 | 34 | 35 | 36 | 37 | 38 | 39 | 40 | 41 | 42 |
| composition (wt %) | exchanged water) | | | | | | | | | | | | |
| | Glycerin | 24.0 | 24.5 | 25.0 | 25.4 | 25.7 | 26.0 | 25.5 | 26.0 | 26.5 | 26.8 | 27.2 | 27.5 |
| | Dipropylene glycol-n-propyl ether | 2.0 | 2.0 | 2.0 | 2.0 | 2.0 | 2.0 | 2.0 | 2.0 | 2.0 | 2.0 | 2.0 | 2.0 |
| | SN-100D (*1) | 16.7 | 10.0 | 3.3 | 1.7 | 0.3 | — | 16.7 | 10.0 | 3.3 | 1.7 | 0.3 | — |
| | C.I. Pigment Red 122 | 4.0 | 4.0 | 4.0 | 4.0 | 4.0 | 4.0 | — | — | — | — | — | — |
| | C.I. Pigment Blue 15:3 | — | — | — | — | — | — | 3.0 | 3.0 | 3.0 | 3.0 | 3.0 | 3.0 |
| | Polyoxyethylene lauryl ether ammonium sulfate (*2) | 1.2 | 1.2 | 1.2 | 1.2 | 1.2 | 1.2 | 1.0 | 1.0 | 1.0 | 1.0 | 1.0 | 1.0 |
| Amount of ATO fine particles (wt %) | | 5.0 | 3.0 | 1.0 | 0.5 | 0.1 | 0 | 5.0 | 3.0 | 1.0 | 0.5 | 0.1 | 0 |

(*1): Product of Ishihara Sangyo Kaisha, Ltd., aqueous dispersion of ATO fine particles, solids content: 30 wt %
(*2): Average polymerization degree of oxyethylene = 12
* The ink composition is expressed in the weight percent ratio of each component actually contained in the ink to the total weight of the ink.

(2) Measurement of Infrared Reflection Spectrum of Recorded Objects and Evaluation of Infrared Absorptivity Each of the prepared inks was filled into a predetermined ink cartridge and was printed on Brother A4 ink-jet paper (BP60MA) using a digital multifunction device equipped with an ink-jet printer (DCP-115, product of Brother Industries, Ltd.). The reflection spectrum of the recorded object with respect to the reflectivity of the recording medium was measured in a wavelength range of from 380 nm to 2,000 nm by using a spectrophotometer (UV-3100PC, product of Shimadzu Corporation). The infrared absorptivity of the recorded object was evaluated by the criteria below according to the reflectivity at wavelengths of 900 nm, 1,400 nm and 2,000 nm. The results obtained are summarized in Table 5.

<Criteria for Evaluating Infrared Absorptivity>

AA: The reflectivity is less than 60% (sufficiently high infrared absorptivity was found).

A: The reflectivity is 60% or more and less than 75% (sufficiently high infrared absorptivity was found).

B: The reflectivity is 75% or more and less than 90% (infrared absorptivity was found).

C: The reflectivity is 90% or more and less than 95% (absorption was weak, but infrared absorptivity was found).

D: The reflectivity is 95% or more (no infrared absorptivity was found).

TABLE 5

| Ink No. | Amount of ATO fine particles (wt %) | 900 nm Reflectivity (%) | Evaluation | 1,400 nm Reflectivity (%) | Evaluation | 2,000 nm Reflectivity (%) | Evaluation |
|---|---|---|---|---|---|---|---|
| 1 | 5.0 | 77.93 | B | 52.82 | AA | 32.20 | AA |
| 7 | | 77.99 | B | 53.07 | AA | 32.85 | AA |
| 13 | | 77.69 | B | 52.55 | AA | 32.06 | AA |
| 19 | | 78.13 | B | 53.30 | AA | 32.81 | AA |
| 25 | | 75.30 | B | 50.57 | AA | 30.91 | AA |
| 31 | | 79.13 | B | 56.06 | AA | 35.78 | AA |
| 37 | | 75.24 | B | 52.77 | AA | 33.33 | AA |
| 2 | 3.0 | 86.03 | B | 64.80 | A | 42.46 | AA |
| 8 | | 84.57 | B | 62.93 | A | 41.32 | AA |
| 14 | | 87.36 | B | 67.07 | A | 44.49 | AA |
| 20 | | 86.04 | B | 65.05 | A | 42.79 | AA |
| 26 | | 83.12 | B | 62.70 | A | 41.71 | AA |
| 32 | | 86.29 | B | 68.72 | A | 48.34 | AA |
| 38 | | 83.41 | B | 65.46 | A | 44.38 | AA |
| 3 | 1.0 | 92.79 | C | 83.15 | B | 67.35 | A |
| 9 | | 95.14 | C | 84.48 | B | 68.04 | A |
| 15 | | 95.89 | C | 85.90 | B | 69.55 | A |
| 21 | | 95.39 | C | 85.18 | B | 68.93 | A |
| 27 | | 92.64 | C | 81.23 | B | 64.08 | A |
| 33 | | 93.20 | C | 84.74 | B | 71.32 | A |
| 39 | | 90.50 | C | 81.76 | B | 66.36 | A |
| 4 | 0.5 | 98.21 | C | 93.14 | C | 83.65 | B |
| 10 | | 97.49 | C | 92.37 | C | 82.43 | B |
| 16 | | 98.35 | C | 94.02 | C | 86.02 | B |
| 22 | | 97.57 | C | 92.87 | C | 83.02 | B |
| 28 | | 97.55 | C | 91.56 | C | 80.71 | B |
| 34 | | 97.70 | C | 93.63 | C | 84.18 | B |
| 40 | | 97.14 | C | 92.75 | C | 83.14 | B |
| 5 | 0.1 | 98.96 | D | 97.09 | D | 92.98 | C |
| 11 | | 98.91 | D | 96.34 | D | 91.37 | C |
| 17 | | 99.27 | D | 97.38 | D | 93.32 | C |
| 23 | | 99.08 | D | 97.55 | D | 94.49 | C |
| 29 | | 99.50 | D | 97.64 | D | 93.62 | C |
| 35 | | 98.88 | D | 96.73 | D | 91.38 | C |
| 41 | | 98.20 | D | 97.34 | D | 94.03 | C |
| 6 | 0 | 99.59 | D | 98.59 | D | 96.67 | D |
| 12 | | 99.76 | D | 98.67 | D | 96.35 | D |
| 18 | | 99.87 | D | 98.83 | D | 96.58 | D |
| 24 | | 100.11 | D | 98.90 | D | 96.71 | D |
| 30 | | 97.64 | D | 96.86 | D | 95.89 | D |
| 36 | | 96.54 | D | 96.81 | D | 95.22 | D |
| 42 | | 95.62 | D | 96.75 | D | 95.23 | D |

(3) Evaluation Results

As can be seen from Table 5, for the recorded objects recorded with the inks not comprising the ATO fine particles, the evaluation results of the infrared absorptivity were "D" at all the wavelengths (900 nm, 1,400 nm and 2,000 nm).

For the inks comprising 0.1 wt % of the ATO fine particles, the evaluation results of the infrared absorptivity at a wavelength of 2,000 nm were "C." It may be seen that the infrared absorptivity was improved as compared to that of the inks not comprising the ATO fine particles. For the inks comprising 0.5 wt % of the ATO fine particles, the evaluation results of the infrared absorptivity were "B" at a wavelength of 2,000 nm and "C" at wavelengths of 1,400 nm and 900 nm. It may be seen that the infrared absorptivity was further improved as compared to that of the inks comprising 0.1 wt % of the ATO fine particles. For the inks comprising 1.0 wt % of the ATO fine particles, the evaluation results of the infrared absorptivity were "A" at a wavelength of 2,000 nm and "B" at a wavelength of 1,400 nm. It may be seen that the infrared absorptivity was further improved as compared to that of the inks comprising 0.5 wt % of the ATO fine particles. For the inks comprising 3.0 wt % of the ATO fine particles, the evaluation results of the infrared absorptivity were "AA" at a wavelength of 2,000 nm, "A" at a wavelength of 1,400 nm and "B" at a wavelength of 900 nm. It may be seen that the infrared absorptivity was further improved as compared to that of the inks comprising 1.0 wt % of the ATO fine particles. For the inks comprising 5.0 wt % of the ATO fine particles, the evaluation results of the infrared absorptivity were "AA" at a wavelength of 1,400 nm. It may be seen that the infrared absorptivity was further improved as compared to that of the inks comprising 3.0 wt % of the ATO fine particles.

The present invention is not limited to the embodiments described in the Examples, which are provided for illustrative purposes only. The material substances, their amounts used, and the conditions of producing them may be varied and modified without departing from the spirit and the scope of the invention as described herein.

What is claimed is:

1. A water-based infrared absorptive ink for ink-jet recording, comprising:
   a coloring agent that exhibits a color in the visible light range; and
   antimony-tin composite oxide fine particles, each particle having a size and the particles being provided in amount, such that the particles appear colorless and transparent in the visible light range.

2. The water-based infrared absorptive ink for ink-jet recording according to claim 1, wherein the amount of the antimony-tin composite oxide fine particles is in a range of from about 0.3 wt % to about 10 wt %.

3. The water-based infrared absorptive ink for ink-jet recording according to claim 1, wherein the antimony-tin composite oxide fine particles have an average particle diameter in a range from about 5 nm to about 800 nm.

4. The water-based infrared absorptive ink for ink-jet recording according to claim 3, wherein the antimony-tin composite oxide fine particles have an average particle diameter of about 200 nm.

5. The water-based infrared absorptive ink for ink-jet recording according to claim 3, wherein the antimony-tin composite oxide fine particles have an average particle diameter of about 10 nm.

6. The water-based infrared absorptive ink for ink-jet recording according to claim 3, wherein the antimony-tin composite oxide fine particles have an average particle diameter in a range from about 10 nm to about 200 nm.

7. The water-based infrared absorptive ink for ink-jet recording according to claim 1, wherein the coloring agent is a water-soluble dye, and the amount thereof with respect to the total amount of the water-based infrared absorptive ink is in a range from about 0.1 wt % to about 10 wt %.

8. The water-based infrared absorptive ink for ink-jet recording according to claim 1, wherein the coloring agent is an infrared transparent pigment, and the amount thereof with respect to the total amount of the water-based infrared absorptive ink is in a range from about 1 wt % to about 10 wt %.

9. The water-based infrared absorptive ink for ink-jet recording according to claim 8, wherein the infrared transparent pigment has an average particle diameter in a range from about 5 nm to about 800 nm.

10. The water-based infrared absorptive ink for ink-jet recording according to claim 8, further comprising water in an amount in a range from about 10 wt % to about 95 wt %, and as soluble organic solvents, a humectant in an amount in a range from about 5 wt % to about 50 wt % and a penetrant in an amount in a range from about 0.5 wt % to 10 wt %, with respect to the total amount of the water-based infrared absorptive ink.

11. The water-based infrared absorptive ink for ink-jet recording according to claim 1, wherein the amount of the antimony-tin composite oxide fine particles is in a range from about 0.3 wt% to about 10 wt%, and the antimony-tin composite oxide fine particles have an average particle diameter in a range from about 5 nm to about 800 nm.

12. An ink-jet recording method comprising the step of recording an image on a recording medium by ejecting a water-based infrared absorptive ink onto the recording medium so as to cause the water-based infrared absorptive ink to adhere to the recording medium, wherein the water-based infrared absorptive ink comprises:
   a coloring agent that exhibits a color in the visible light range; and
   an antimony-tin composite oxide fine particles that impart infrared absorptivity to the image, the antimony-tin composite oxide fine particles, each particle having a size and the particles being provided in amount, such that the particles appear colorless and transparent in the visible light range.

13. The ink-jet recording method according to claim 12, wherein an ink comprising no infrared absorptive materials is used in addition to the water-based infrared absorptive ink for ink-jet recording to record the image for improving security of the image.

14. An ink-jet recording apparatus comprising:
   an ink storage unit that stores a water-based infrared absorptive ink for ink-jet recording that comprises:
      a coloring agent that exhibits a color in the visible light range; and
      antimony-tin composite oxide fine particles, each particle having a size and the particles being provided in amount, such that the particles appear colorless and transparent in the visible light range; and
   an ejection mechanism that ejects a droplet of the water-based infrared absorptive ink for ink-jet recording.

* * * * *